(12) United States Patent
Ito et al.

(10) Patent No.: US 7,438,883 B2
(45) Date of Patent: Oct. 21, 2008

(54) HIGH-PRESSURE PHASE SILICON NITRIDE HAVING A CUBIC SPINEL STRUCTURE AND THE MANUFACTURING METHOD

(75) Inventors: Kenji Ito, Aichi-ken (JP); Katsuhiko Takahashi, Aichi-ken (JP); Toshimori Sekine, Tsukuba (JP)

(73) Assignees: NOF Corporation, Tokyo (JP); National Institute for Materials, Ibaraki-Ken (JP)

( * ) Notice: Subject to any disclaimer, the term of this patent is extended or adjusted under 35 U.S.C. 154(b) by 775 days.

(21) Appl. No.: 10/830,852

(22) Filed: Apr. 23, 2004

(65) Prior Publication Data

US 2005/0013760 A1    Jan. 20, 2005

(30) Foreign Application Priority Data

Apr. 23, 2003    (JP) .............................. 2003-118493

(51) Int. Cl.
*C01B 21/06* (2006.01)
*C01B 21/068* (2006.01)
*C01B 33/00* (2006.01)

(52) U.S. Cl. ....................................... 423/344; 423/406
(58) Field of Classification Search ................. 423/344, 423/406
See application file for complete search history.

(56) References Cited

U.S. PATENT DOCUMENTS

| 5,079,198 | A | * | 1/1992 | Edler et al. | ................ | 501/97.2 |
| 6,589,899 | B2 | * | 7/2003 | Sekine et al. | ............... | 501/98.1 |
| 6,982,070 | B2 | * | 1/2006 | Sekine et al. | ................ | 423/344 |
| 2002/0037803 | A1 | * | 3/2002 | Niwa et al. | ................. | 501/97.1 |
| 2002/0045529 | A1 | * | 4/2002 | Sekine et al. | ............... | 501/96.5 |
| 2002/0053542 | A1 | * | 5/2002 | Miyakawa et al. | ........ | 210/510.1 |
| 2003/0186800 | A1 | * | 10/2003 | Sekine et al. | ............... | 501/97.1 |

FOREIGN PATENT DOCUMENTS

| JP | 46-32955 | | 2/1973 |
| JP | 02-253838 | | 10/1990 |
| JP | 2001-199714 | | 7/2001 |
| JP | 2001199714 A | * | 7/2001 |
| JP | 2002179412 A | * | 6/2002 |

OTHER PUBLICATIONS

Sekine, T., Synthesis and Sintering of Cubic Silicon Nitride (cSi3N4), Proceedings of High Pressure Science and Technology, Seminar Series (24), 24:51-56 (May 24, 2002).
Sekine, T., Synthesis and Sintering of Cubic Silicon Nitride (cSi3N4), Review of High Pressure Science and Technology, 13(1):55-60 (Feb. 20, 2003).

* cited by examiner

*Primary Examiner*—Timothy C. Vanoy
*Assistant Examiner*—Serena L Hanor
(74) *Attorney, Agent, or Firm*—Sheridan Ross P.C.

(57) ABSTRACT

A method for preparing a high-pressure phase cubic spinel-type silicon nitride includes housing a molding containing low-pressure phase silicon nitride powder and a metal powder in a cylindrical container, arranging an explosive in the cylindrical container so as to surround the molding, and exploding the explosive to compress the molding. An X-ray diffraction pattern of the high-pressure phase cubic spinel-type silicon nitride produced according to the method of the present invention shows a maximum peak having a full width at half maximum of 0.65 degrees or less. TG-DTA analysis of the cubic spinel-type silicon nitride shows a weight change starting temperature of 700 to 1100° C.

3 Claims, 3 Drawing Sheets

HIGH-PRESSURE PHASE SILICON NITRIDE HAVING A CUBIC SPINEL STRUCTURE AND THE MANUFACTURING METHOD

BACKGROUND OF THE INVENTION

The present invention relates to a high-pressure phase cubic spinel-type silicon nitride and its preparation method.

Japanese Patent Laid-Open Publication No. 2001-199714 discloses a method for preparing a high-pressure phase spinel-type silicon nitride in the prior art. In the prior art method, first a mixture of low-pressure phase silicon nitride powder and metal powder are pressurized to form a molding. This molding is placed in a stainless steel container and immobilized in the stainless steel container using a cover with screws. This stainless steel container is embedded in a large, steel cylindrical housing, and this housing is used as a target. A projectile equipped with a metal flying plate on the front surface of a high-density polyethylene servo is provided. The projectile is accelerated with an explosive gun and made to collide with the target. The molding is compressed by the shock wave generated by collision with the projectile to obtain a high-pressure phase silicon nitride.

However, since the projectile collides with one side of the housing, impact pressure only acts from one side on the molding inside the housing. If a relatively large amount of samples (mixtures of low-pressure phase silicon nitride powder and metal powder) is used in the prior art method, it is difficult for adequate impact pressure to act on the molding, resulting in low compression efficiency of the molding. In addition, due to the low conversion rate from low-pressure phase silicon nitride to high-pressure phase silicon nitride, a large amount of low-pressure phase silicon nitride remains after the compression. Moreover, due to the large numbers of lattice defects and impurities, a high-pressure phase cubic spinel-type silicon nitride having a low degree of crystallinity ends up being obtained. In the prior art method, a high-pressure phase cubic spinel-type silicon nitride was not produced efficiently.

SUMMARY OF THE INVENTION

The object of the present invention is to provide a high-pressure phase silicon nitride with excellent crystallinity. Another object of the present invention is to provide an efficient method for preparing a high-pressure phase silicon nitride with excellent crystallinity.

To achieve the above object, one aspect of the present invention is a high-pressure phase cubic spinel-type silicon nitride that demonstrates an X-ray diffraction pattern including a maximum peak having a full width at half maximum for an X-ray diffraction angle of 0.65 degrees or less.

Another aspect of the present invention is a method for preparing a high-pressure phase cubic spinel-type silicon nitride. The method includes preparing a mixture of low-pressure phase silicon nitride powder and a metal powder, pressurizing the mixture to form a molding, housing the molding in a container, arranging an explosive within the container so as to surround the molding, and detonating the explosive to compress the molding by allowing impact pressure to act on the molding.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiment together with the accompanying drawings in which.

DETAILED DESCRIPTION OF THE PREFERRED EMBODIMENT

The following provides a description of high-pressure phase cubic spinel-type silicon nitride and a preparation method thereof according to one embodiment of the present invention with reference to the drawings.

A high-pressure phase cubic spinel-type silicon nitride ($Si_3N_4$) of one embodiment demonstrates an X-ray diffraction pattern, which is obtained by X-ray diffraction measurement, including a maximum peak having a full width at half maximum of 0.65 degrees or less. The full width at half maximum of the maximum peak correlates with the degree of crystallinity of the cubic spinel-type silicon nitride. The smaller the full width at half maximum, the higher the degree of crystallinity. In other words, the sharper the maximum peak of the X-ray diffraction pattern, the higher the degree of crystallinity. In addition, the sharper the maximum peak, the fewer the number of crystal lattice defects and the lower the level of heterophasic substances, such as impurities and low-pressure phase silicon nitride. Since the peaks (except for the maximum peak that indicates cubic spinel-type silicon nitride) have a relatively weak intensity, they are not suitable as representative values for determining the crystallinity of silicon nitride. On the other hand, since the maximum peak has a relatively large full width at half maximum and most prominently expresses the crystallinity of silicon nitride, it is used as a representative value for determining the crystallinity of silicon nitride.

Figure 5:
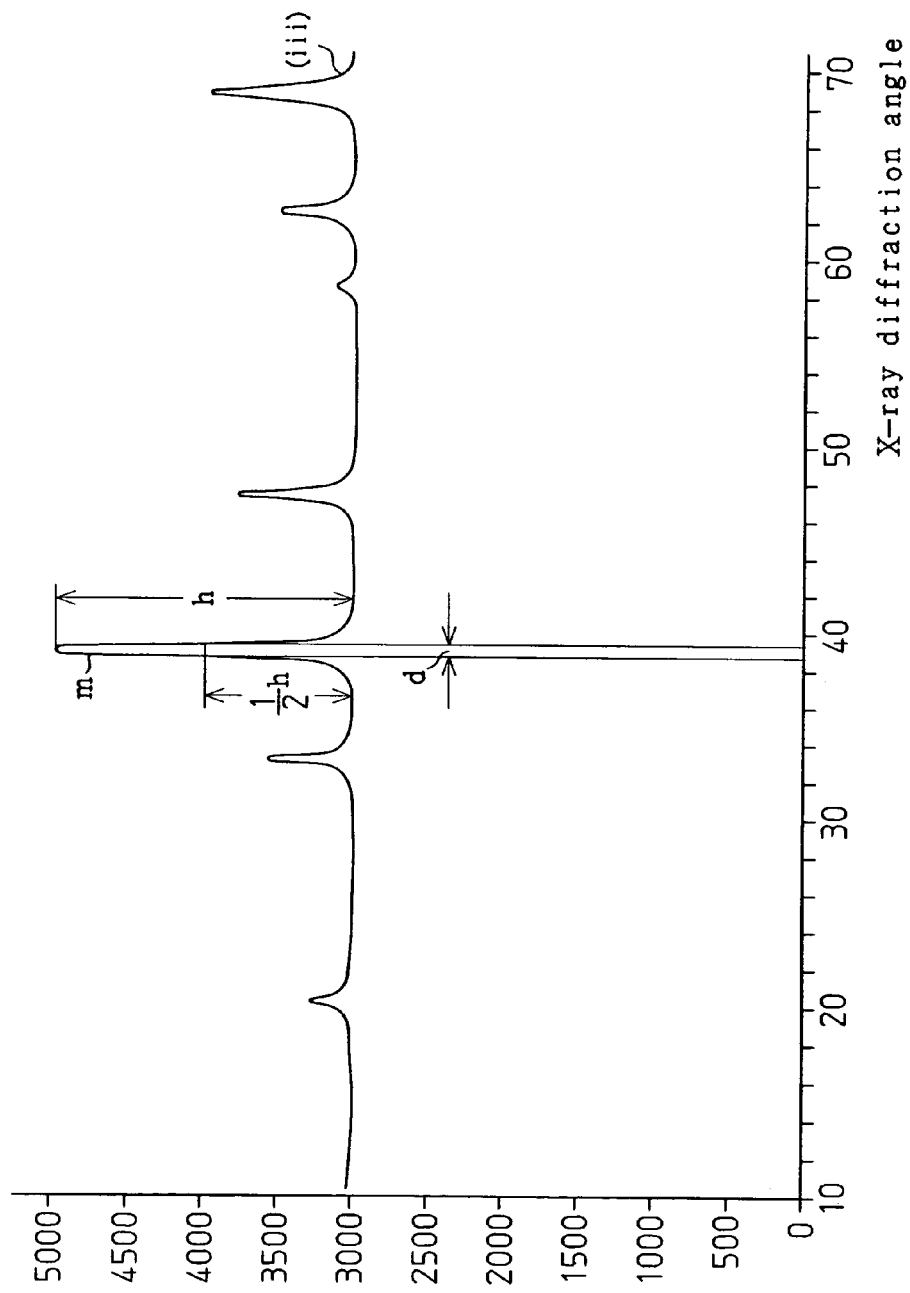
FIG. 5 is a partial enlarged view of the X-ray diffraction pattern of FIG. 3.

The full width at half maximum is preferably 0.60 degrees or less and more preferably 0.55 degrees or less. The lower limit value is the value corresponding to a single crystal of cubic spinel-type silicon nitride, namely about 0.2 degrees. If the full width at half maximum exceeds 0.65 degrees, the crystallinity is low. FIG. 5 shows an X-ray diffraction pattern for high-pressure phase cubic spinel-type silicon nitride obtained in Example 1, which will be described later. The X-axis represents the X-ray diffraction angle 2θ (twice the diffraction angle), and the Y-axis represents the X-ray diffraction intensity. A plurality of peaks indicating a high-pressure phase cubic spinel-type silicon nitride can be seen in FIG. 5. The maximum peak m among these peaks has the height h. The full width at half maximum d of the maximum peak m is the width at half height (½ h) of the peak. The unit of the full width at half maximum is the input or output angle of X-rays during X-ray diffraction, namely the X-ray diffraction angle 2θ.

Figure 2:
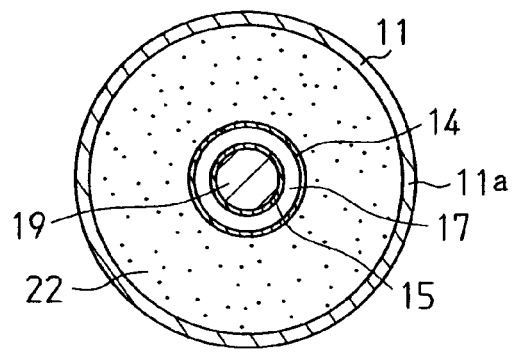
FIG. 2 is a cross-sectional view taken along 2-2 line of the apparatus of FIG. 1.
Figure 3:
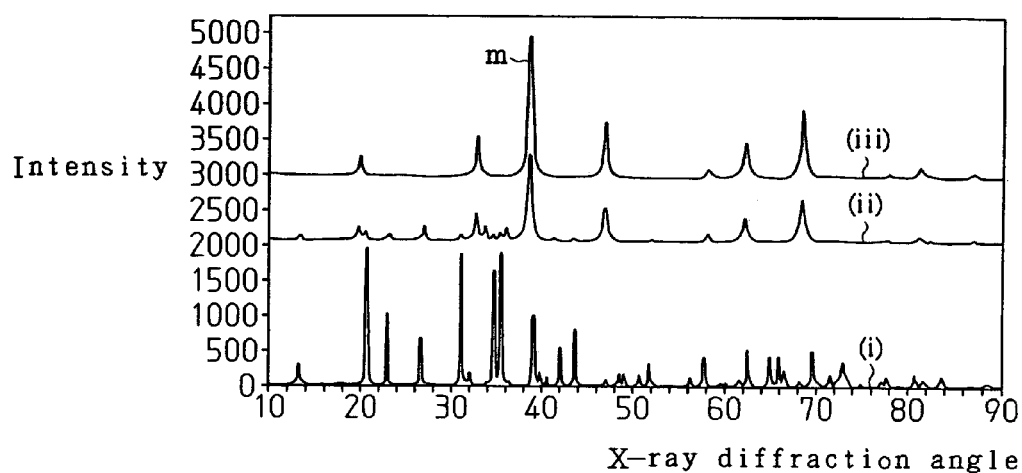
FIG. 3 is an X-ray diffraction pattern of a high-pressure phase cubic spinel-type silicon nitride according to Example 1.

As shown in FIGS. 2 and 3, for example, a peak at an angle 2θ of 38.6 degrees indicates diffraction in the (311) face of the face indices (Miller indices (hk)) that represent the crystal lattice planes of cubic spinel-type silicon nitride. Furthermore, the crystal lattice planes refer to the faces in the case of collecting the lattice points of a crystal into groups of mutually parallel faces. In addition, the face indices (Miller indices (hkl)) are represented with a group of mutually prime integers obtained by representing distances X, Y and Z to the origin from points A, B and C, where the crystal lattice plane closest to origin of axes a, b and c intersects the three axes, with x, y and z in units of axis lengths a', b' and c', taking their inverses 1/x, 1/y and 1/z, and then using their integer multiples. The (311) face is a typical face that represents the crystal structure of cubic spinel-type silicon nitride, and is indicated by a maximum peak that appears at a diffraction angle 2θ of 38.6 degrees.

A cubic spinel-type silicon nitride in which the full width at half maximum of the maximum peak of the X-ray diffraction angle is 0.65 degrees or less is higher in strength than α-type (trigonal system) silicon nitride and β-type silicon nitride (hexagonal system), and has a strength that is lower only than diamond and cubic boron nitride (cBN). The high-pressure phase cubic spinel-type silicon nitride can be used as polishing materials or cutting tools and so forth in the same applications as those of diamonds and cubic boron nitride.

In addition, the cubic spinel-type silicon nitride has a weight change starting temperature (temperature at which weight changes takes place), which is measured by a simultaneous thermogravimetry/differential thermal analysis (TG-DTA), that is preferably 700 to 1100° C. The weight change includes weight gain due to oxidative decomposition of silicon nitride and conversion to silicon dioxide. The higher the weight change starting temperature, the better the thermal stability of the cubic spinel-type silicon nitride. Thus, the weight change starting temperature can also be referred to as the heat resistance temperature of the silicon nitride.

The larger the particle diameter of the high-pressure phase cubic spinel-type silicon nitride particles, the smaller the specific surface area and the higher the thermal stability. Simultaneous thermogravimetry/differential thermal analysis is a useful way of analysis that makes it possible to determine weight loss due to oxidation in air (oxidizing atmosphere) and heat balance in a single measurement, and thus the analysis offers better efficiency than separately carrying out thermogravimetry (TG) and differential thermal analysis (DTA). Another known analysis method is a thermal abrasion resistance test. However, the thermal abrasion resistance test is not suitable for testing of powder samples.

Next, a method and an apparatus for preparing a high-pressure phase cubic spinel-type silicon nitride will now be described. The objective is achieved by defining the initial sample state and conditions of the impact environment during substance synthesis using a high-temperature and high-pressure state generated by instantaneous shock compression that can be realized with a shock compression treatment apparatus that uses an explosive. More specifically, after mixing a low-pressure phase silicon nitride powder (e.g., α-type, β-type or amorphous type) with a metal powder and pressure molding the mixture, the resulting molding is subjected to shock compression treatment, and by allowing impact pressure to act on the molding, a high-pressure phase cubic spinel-type silicon nitride can be produced. Conditions prior to shock compression treatment include selection of the starting material, the type of metal mixed, mixing ratio of the starting materials and porosity or density of the resulting pressure molding.

The smaller the particle diameter of the low-pressure phase silicon nitride powder used as the starting material, the greater the improvement of the conversion rate to a high-pressure phase cubic spinel-type silicon nitride. The particle diameter is preferably within the range of 0.01 to 100 μm. In addition, an α-type, β-type or amorphous type can be used for the low-pressure phase silicon nitride powder.

The metal powder serves as a matrix within the starting material. Examples of metal powders that can be used include atomized powder, electrolytic powder and finely crushed powder. The shape of the metal powder is preferably spherical for ease of filling. A non-spherical metal powder, such as electrolytic powder, can also be used in combination for the purpose of retaining the low-pressure phase silicon nitride powder within the matrix of the metal powder. The particle diameter of the metal powder is preferably 0.1 to 500 μm, more preferably 10 to 500 μm, still more preferably 20 to 400 μm and more particularly, preferably 50 to 400 μm. In the case the particle diameter of the metal powder is less than 0.1 μm, the metal powder is too small in comparison with the low-pressure phase silicon nitride powder, thereby preventing it from adequately functioning as a matrix. On the other hand, in the case the particle diameter of the metal powder exceeds 500 μm, the metal powder is too large in comparison with the low-pressure phase silicon nitride powder, thereby preventing the low-pressure phase silicon nitride powder from being uniformly dispersed. Thus, such metal powder will not adequately serve as a matrix.

Gold, platinum, silver, copper, iron, nickel, tungsten and mixtures thereof can be used as the metal powder. Among them, copper is preferable in terms of reactivity with silicon nitride and its ease of chemical purification treatment and so forth.

The ratio of metal powder with respect to the mixed powder is arbitrary. The ratio is preferably 70 to 98% by weight, more preferably 75 to 98% by weight, and more particularly, preferably 80 to 98% by weight. If the ratio of metal powder in the mixed powder is less than 70% by weight, it becomes difficult to collect the sample due to decomposition of the silicon nitride and damage due to the sample tube caused by excessive temperature rise of the sample. On the other hand, if the ratio of the metal powder in the powder mixture exceeds 98% by weight, although it is theoretically possible to convert it to silicon nitride even at a ratio of 99.99% by weight, the amount of silicon nitride obtained decreases if the ratio of metal increases, thereby lowering preparation efficiency.

The mixture of metal powder and low-pressure phase silicon nitride is pressurized using a hydraulic press and a metal mold, and molded into a molding having a predetermined shape. The porosity (or density) of the molding of the silicon nitride powder and metal powder is important for controlling the temperature rise during impact. The porosity is determined so that the temperature during impact is equal to or below the temperature at which a sufficiently high reaction rate is obtained and silicon nitride does not decompose. The porosity of the molding is preferably 5 to 50%, more preferably 5 to 40% and more particularly, preferably 5 to 30%. In the case this porosity is less than 5%, a special apparatus, such as a high-pressure press, must be used to mold the mixed powder, the temperature does not rise sufficiently during shock compression treatment, and the reaction rate is slow. On the other hand, in case the porosity exceeds 50%, molding tends to become difficult even if an alcohol or other molding aid is used, the temperature rises excessively during shock compression treatment resulting in decomposition of the silicon nitride or the silicon nitride melts resulting in damage to the sample container. In addition, the temperature and pressure during shock compression are also related to the selection of the explosive (including combined use).

The molding is placed in a metal container to perform shock compression treatment to be described later. Iron, copper, brass, stainless steel, chromium steel and so forth can be used for the material of the metal container. Examples of the shape of the container include a rectangular parallelepiped, rectangular cylinder and circular cylinder. The molding placed within the metal container is compressed by impact pressure (shock wave) accompanied by high temperature and high pressure generated by the explosion of an explosive using a shock compression treatment apparatus as indicated below, for example (shock compression treatment).

Figure 1:
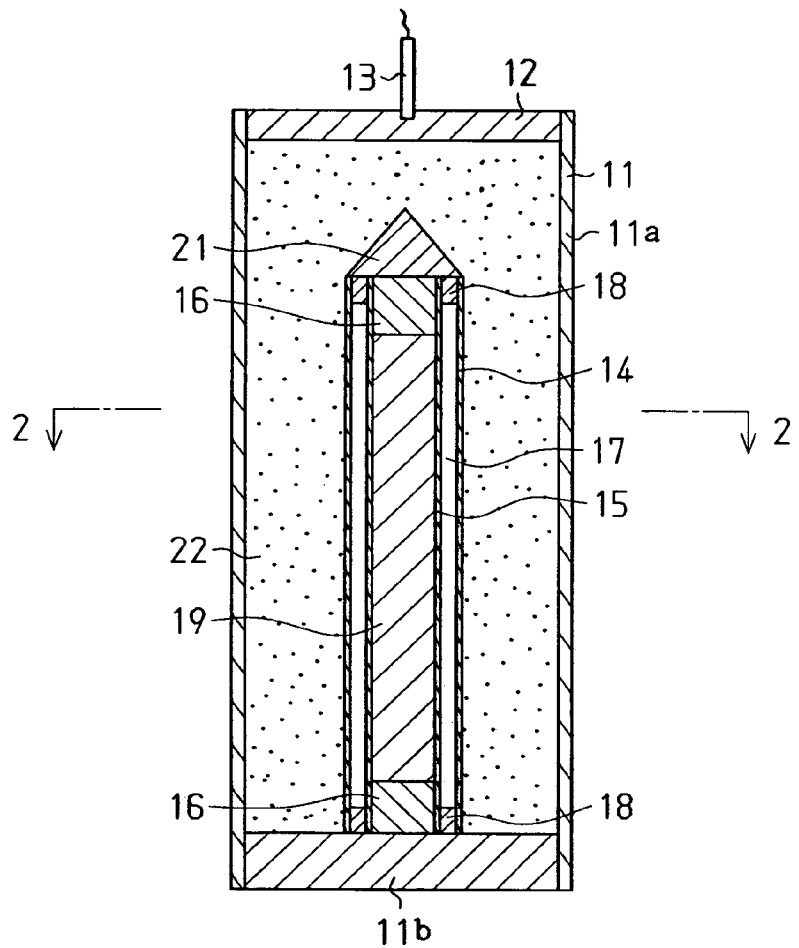
FIG. 1 is a cross-sectional view of an apparatus used for preparation of a high-pressure phase cubic spinel-type silicon nitride according to one embodiment of the present invention.

The following provides a description of a shock compression treatment apparatus used to produce a high-pressure phase cubic spinel silicon nitride with reference to FIGS. 1 and 2.

A metal container 11 includes a cylindrical peripheral wall 11a and a bottom wall 11b thicker than peripheral wall 11a and joined to the inner surface of the peripheral wall 11a. A booster explosive 12 molded into a thick disk is arranged on the upper edge of the peripheral wall 11a. A detonator 13 is provided in the center of the upper surface of the explosive 12. The booster explosive 12 explodes in a radiating pattern from the center to the periphery as a result of the triggering detonator 13.

A cylindrical sleeve 14 is provided upright in the center on the inner surface of the bottom wall 11b. A cylindrical sample tube 15 is arranged inside the sleeve 14 and concentric with the sleeve 14 by upper and lower locking rings 18. Thus, the distance between the sample tube 15 and the sleeve 14 is substantially constant, and a tubular space 17 is defined between the sleeve 14 and the sample tube 15. A lower plug 16 is arranged in the bottom portion inside the sample tube 15, a cylindrical molding 19 molded from a mixed powder of low-pressure phase silicon nitride and metal powder is filled thereon, and its upper edge is sealed with the upper plug 16. As shown in FIG. 2, the molding 19, the sample tube 15, the sleeve 14 and the container 11 (peripheral wall 11a) are substantially concentric. Thus, the distance between the sleeve 14 and the container 11 is substantially constant, and a tubular space is defined between the sleeve 14 and the container 11. This tubular space is filled with an explosive 22.

The peripheral wall 11a, the bottom wall 11b, the sleeve 14, the sample tube 15 and the upper and lower plugs 16 are all made of metal.

A conical cap 21 is placed on the upper end surface of the sleeve 14 and the sample tube 15. The conical cap 21 relaxes impact pressure applied downward towards the center of the molding 19 from the upper edge of the sample tube 15. A material having a density lower than metal, such as synthetic resins, wood or gypsum, is suitable for the material of the conical cap 21.

An explosive 22 is loaded into the container 11 so as to cover the periphery of the sleeve 14 and the upper portion of the conical cap 21. Although various types of explosives can be used for the explosive 22, examples of the explosive 22 include dynamite, ammonium nitrate fuel oil explosive (ANFO), water-containing explosives, HMX and PBX. The explosive 22 generates impact pressure within the container 11 due to the booster explosive 12 exploding as a result of being triggered by the detonator 13. The low-pressure phase cubic spinel-type silicon nitride within the sample tube 15 is phase-converted to a high-pressure phase cubic spinel-type silicon nitride by this impact pressure. The impact pressure generated by the sleeve 14 being rapidly compressed by the explosion of the explosive 22 is efficiently transmitted to the sample tube 15 through the tubular space 17, and a uniform impact pressure acts on the molding 19. That is, the tubular space 17 equalizes the impact pressure.

The impact pressure is preferably 20 to 90 GPa, more preferably 30 to 80 GPa, and more particularly, preferably 40 to 80 GPa. If the impact pressure is less than 20 GPa, a high-pressure phase cubic spinel-type silicon nitride will not be obtained having high yield. On the other hand, if the impact pressure exceeds 90 GPa, the silicon nitride will decompose or melt thereby making it difficult to collect the molding 19 when the pressure is released. Thus, a high-pressure phase cubic spinel-type silicon nitride will not be obtained having high yield.

When the detonator 13 located on the upper edge of the shock compression treatment apparatus is triggered, the booster explosive 12 is ignited and explodes. As a result of the detonation of the booster explosive 12, the explosive 22 instantaneously explodes from the upper portion to the lower portion within the container 11, and the impact pressure (shock wave) propagates from the upper portion to the lower portion. At this time, the molding 19 is compressed by the impact pressure from the outside of the sleeve 14 within the sample tube 15, namely from the outside of the sample tube 15, towards the axis (central axis) of the sample tube 15 (or the molding 19).

Since a large amount of explosive 22 is filled so as to surround the molding 19, the duration of the shock wave can be prolonged, thereby improving the crystallinity during conversion of cubic spinel-type silicon nitride from the low-pressure phase to the high-pressure phase.

After the shock compression treatment, the molding 19 is collected and metal components derived from the metal powder matrix are removed from the molding 19 to purify the desired, impact pressurized molding 19. For example, in the case of using an iron powder matrix, the iron component is dissolved with hydrochloric acid. In the case of using a copper powder matrix, the copper component is dissolved with nitric acid or aqua regia to purify the molding 19.

After the impact pressurization, the mixed silicon nitride powder containing a low-pressure phase and a high-pressure phase is subjected to a purification treatment using, for example, hydrofluoric acid to isolate and purify the high-pressure phase cubic spinel-type silicon nitride.

In the case of measuring the X-ray diffraction of the high-pressure phase cubic spinel-type silicon nitride obtained in this manner, the full width at half maximum d of the maximum peak m of the X-ray diffraction angle is 0.65 degrees or less. On this basis, the method of the present invention is understood to be able to prepare a high-pressure phase cubic spinel-type silicon nitride having a high degree of crystallinity. When crystallinity increases, the high level of bonding inherent to a substance appears resulting in enhanced physical properties, such as strength and thermal stability.

In the case of measuring the weight change starting temperature of high-pressure phase cubic spinel-type silicon nitride by thermogravimetry/differential thermal analysis (TG-DTA), the weight change starting temperature is 700 to 1100° C. This being the case, the method of the present invention is understood to be able to prepare a high-pressure phase cubic spinel-type silicon nitride having a high level of thermal stability.

The following provides a summary of the effects demonstrated by the above embodiment.

The high-pressure phase cubic spinel-type silicon nitride of the present embodiment has a low value of 0.65 degrees or less for the full width at half maximum d of the maximum peak m among the peaks of cubic spinel-type silicon nitride measured by X-ray diffraction. Consequently, it has few crystal lattice defects, contains low levels of impurities, demonstrates low levels of contamination by different phases, such as a low-pressure phase, and has superior crystallinity. Thus, the high-pressure phase cubic spinel-type silicon nitride has superior strength.

In addition, the weight change starting temperature of the high-pressure phase cubic spinel-type silicon nitride is 700 to 1100° C. as measured by thermogravimetry/differential thermal analysis (TG-DTA). Thus, the thermal stability, or heat resistance, of the high-pressure phase cubic spinel-type silicon nitride is relatively high.

The high-pressure phase cubic spinel-type silicon nitride is produced by housing a molding of a mixed powder of low-pressure phase silicon nitride powder and metal powder in a container, arranging an explosive around the periphery of the molding, and allowing impact pressure to act on the molding by exploding the explosive resulting in compression of the molding. Consequently, the impact pressure applied to the molding can be increased, the compression efficiency of the molding can be increased, and the conversion rate to a high-pressure phase cubic spinel-type silicon nitride can be improved. Thus, a high-pressure phase cubic spinel-type silicon nitride having the effects as previously described can be produced easily.

As a result of setting the impact pressure to more than 30 GPa and equal to or less than 80 GPa, the compression efficiency of the molding can be reliably increased and the conversion rate to a high-pressure phase cubic spinel-type silicon nitride can be further improved.

Moreover, according to the preparation method of the present embodiment, since an adequate amount of explosive is arranged around the periphery of the molding, a large amount of high-pressure phase cubic spinel-type silicon nitride can be produced in a single round of shock compression treatment. Thus, an ample amount of sample can be secured, thereby making this method advantageous in the evaluation of the characteristics of spinel-type silicon nitride as well as other industrial applications.

Examples of the present invention will be described below.

EXAMPLE 1

90 wt % of copper powder having an average particle diameter of 100 μm was added to 10 wt % of α-silicon nitride powder having an average particle diameter of 0.7 μm followed by mixing with a ball mill to obtain a mixed powder to serve as the raw material substance. This mixed powder was pressurized and loaded into an iron sample tube 15 (outer diameter: 25 mm, inner diameter: 21 mm, length: 240 mm) shown in FIGS. 1 and 2 using a mold to obtain a molded article 19. The loading density in the sample tube 15 was adjusted to 6.6 g/cm$^3$. Upper and lower plugs 16 made of soft steel were press-fit into both ends of the sample tube 15.

A copper pipe for degassing not shown is provided in the lower plug 16. Degassing treatment was carried out by holding at 400° C. and 0.1 Pa for 2 hours using this degassing copper pipe. Following degassing treatment, the sample pipe 15 was housed within a sleeve 14 by means of upper and lower iron locking rings 18 and covered with a conical cap 21. While still in this state, the sample tube 15 was then placed in the center of the container 11 (outer diameter: 73 mm, inner diameter: 67 mm, length: 270 mm) after which an explosive 22 (detonation velocity: 5300 m/sec, specific gravity: 1.4) was loaded between the sleeve 14 and the container 11.

Next, using a no. 6 electrical detonator as the detonator 13, the detonator 13 was triggered to explode a booster explosive 12 which in turn caused the explosive 22 to explode with an impact pressure of about 30 to 45 GPa in its lengthwise direction. After the impact pressurization treatment, the sample tube 15 was collected. The contents of the sample tube 15 were retrieved and placed in dilute nitric acid to dissolve and remove copper and so forth. After washing the resulting powder with water, the powder was dried to obtain cubic spinel-type silicon nitride powder. X-ray diffraction analysis of the resulting powder demonstrates the diffraction pattern shown in FIG. 3.

FIG. 3 shows (i) the diffraction pattern of the sample before shock compression treatment, (ii) the diffraction pattern of the sample after shock compression treatment, and (iii) the diffraction pattern of the sample following purification. Based on the patterns of (ii) and (iii), the sample can be seen to have few peaks attributable to the raw material in the form of α-silicon nitride, while peaks attributable to cubic spinel-type silicon nitride account for the majority of the peaks. The full width at half maximum d of the maximum peak m was 0.529 degrees. In addition, the weight change starting temperature as measured by thermogravimetry/differential thermal analysis (TG-DTA) was 735° C.

EXAMPLE 2

Figure 4:
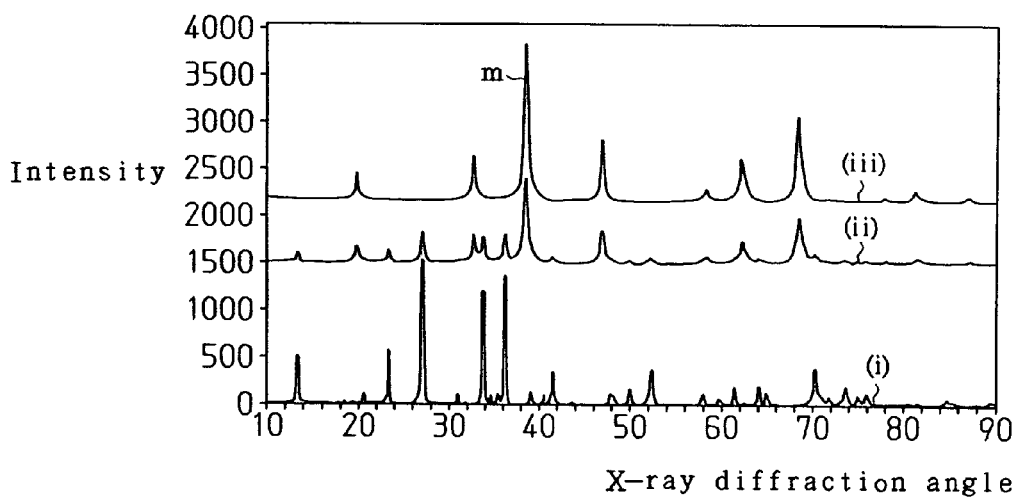
FIG. 4 is an X-ray diffraction pattern of a high-pressure phase cubic spinel-type silicon nitride according to Example 2.

A cubic spinel-type silicon nitride powder was obtained in the same manner as Example 1 with the exception of using β-silicon nitride powder having an average particle diameter of 0.6 μm as the raw material silicon nitride powder. When the resulting powder was identified by X-ray diffraction, in addition to peaks corresponding to β-silicon nitride serving as the raw material, a relatively large number of peaks corresponding to cubic spinel-type silicon nitride were observed as shown in patterns (ii) and (iii) of FIG. 4. The full width at half maximum d of the maximum peak m of the X-ray diffraction angle was 0.620 degrees. In addition, the weight change starting temperature (heat resistance temperature) as measured by thermogravimetry/differential thermal analysis (TG-DTA) was 725° C.

The above embodiment may be modified in the following ways.

If the full width at half maximum d of the maximum peak among the peaks of cubic spinel-type silicon nitride as measured by X-ray diffraction is 0.65 degrees or less, then the weight change starting temperature of high-pressure phase cubic spinel-type silicon nitride as measured by thermogravimetry/differential thermal analysis may be less than 700° C.

The shapes of the container 11, the sleeve 14 and the sample tube 15 of the shock compression treatment apparatus may be a prism shape, such as a rectangular cylinder or a hexagonal cylinder.

The sleeve 14 can be omitted by changing the material, thickness and so forth of the sample tube 15. Moreover, the sample tube 15 can also be omitted.

The conical cap 21 may be integrated with the upper locking ring 18.

A sintering aid, such as alumina ($Al_2O_3$) or yttrium oxide ($Y_2O_3$), may be blended into the mixed powder.

It should be apparent to those skilled in the art that the present invention may be embodied in many other specific forms without departing from the spirit or scope of the invention. Therefore, the present invention is not to be limited to the details given herein, but may be modified within the scope and equivalence of the appended claims.

What is claimed is:

1. A high-pressure phase cubic spinel-type silicon nitride that demonstrates an X-ray diffraction pattern including a maximum peak having a full width at half maximum for an X-ray diffraction angle of 0.65 degrees or less.

2. The high-pressure phase cubic spinel-type silicon nitride according to claim 1, wherein having weight change starting temperature as measured by thermogravimetry/differential thermal analysis is within the range of 700 to 1100° C.

3. A high-pressure phase cubic spinel-type silicon nitride that demonstrates an X-ray diffraction pattern including a peak at a diffraction angle (2θ) of 38.6 degrees and having a full width at half maximum of 0.65 degrees or less.

* * * * *